INVENTOR
CLYDE R. ROCKRIVER
BY
ATTORNEY

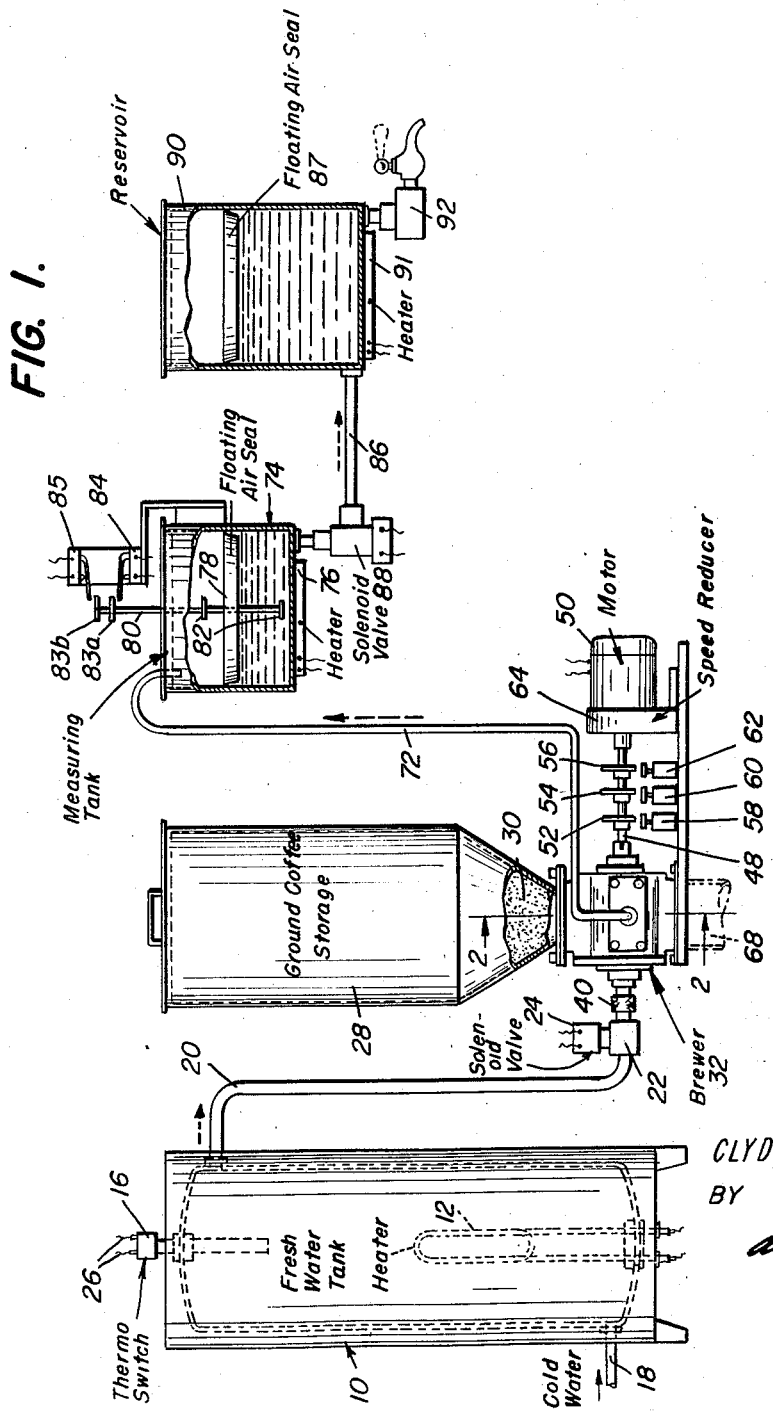

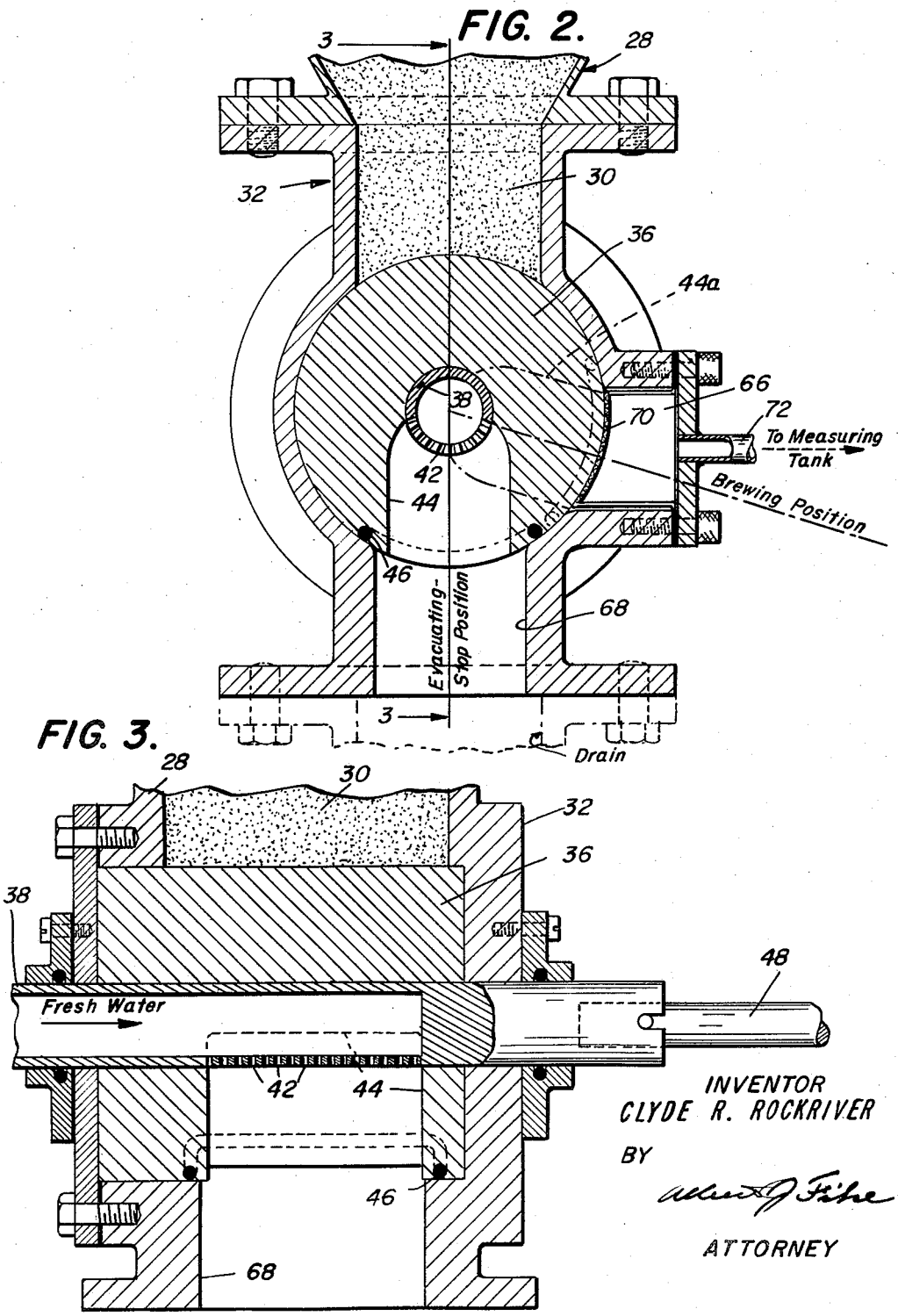

United States Patent Office 2,898,843
Patented Aug. 11, 1959

2,898,843

COFFEE BREWER

Clyde R. Rockriver, Burbank, Calif., assignor to Huggins-Young Company, Inc., Los Angeles, Calif., a corporation of California Application December 3, 1956, Serial No. 625,871

2 Claims. (Cl. 99—283)

This invention relates to an improved coffee brewer and has for one of its principal objects the provision of a device of the class described, which will be entirely automatic in operation, composed of a minimum number of parts and the operation of which is such that a satisfactory brew of coffee will always be produced.

One of the important objects of this invention is to provide an apparatus for brewing coffee or a similar beverage which will provide a continuous supply of freshly brewed beverage, practically regardless of the amount of beverage withdrawn or the number of times that a cup or other container of coffee is taken from the apparatus.

Another object of the invention is the provision of a coffee brewer, having mechanical and electrical controls so constructed and coordinated that no coffee will be brewed until all required conditions, such as water temperature, supply of ground coffee and the disposal of used grounds, have been met.

Another and still further important object of the invention resides in the construction and operation of a coffee brewing apparatus which will automatically measure a quantity of ground coffee, automatically supply a desired flow of properly heated water through the measured ground coffee for a predetermined length of time, deliver the same into a quantity-controlled reservoir, wash away the used grounds and automatically maintain a desired and reserve supply of coffee in a delivery tank at all times.

Other and further important objects of this invention will be apparent from the disclosures in the accompanying drawings and following specification.

The invention, in a preferred form, is illustrated in the drawings and hereinafter more fully described.

In the drawings:

Figure 1 illustrates, somewhat schematically, the construction of the improved coffee brewer of this invention.

Figure 2 is an enlarged section, taken on the plane of the line 2—2 of Figure 1, looking in the direction indicated by the arrows.

Figure 3 is a section on the line 3—3 of Figure 2, looking in the direction indicated.

As shown in the drawings:

Figure 4:
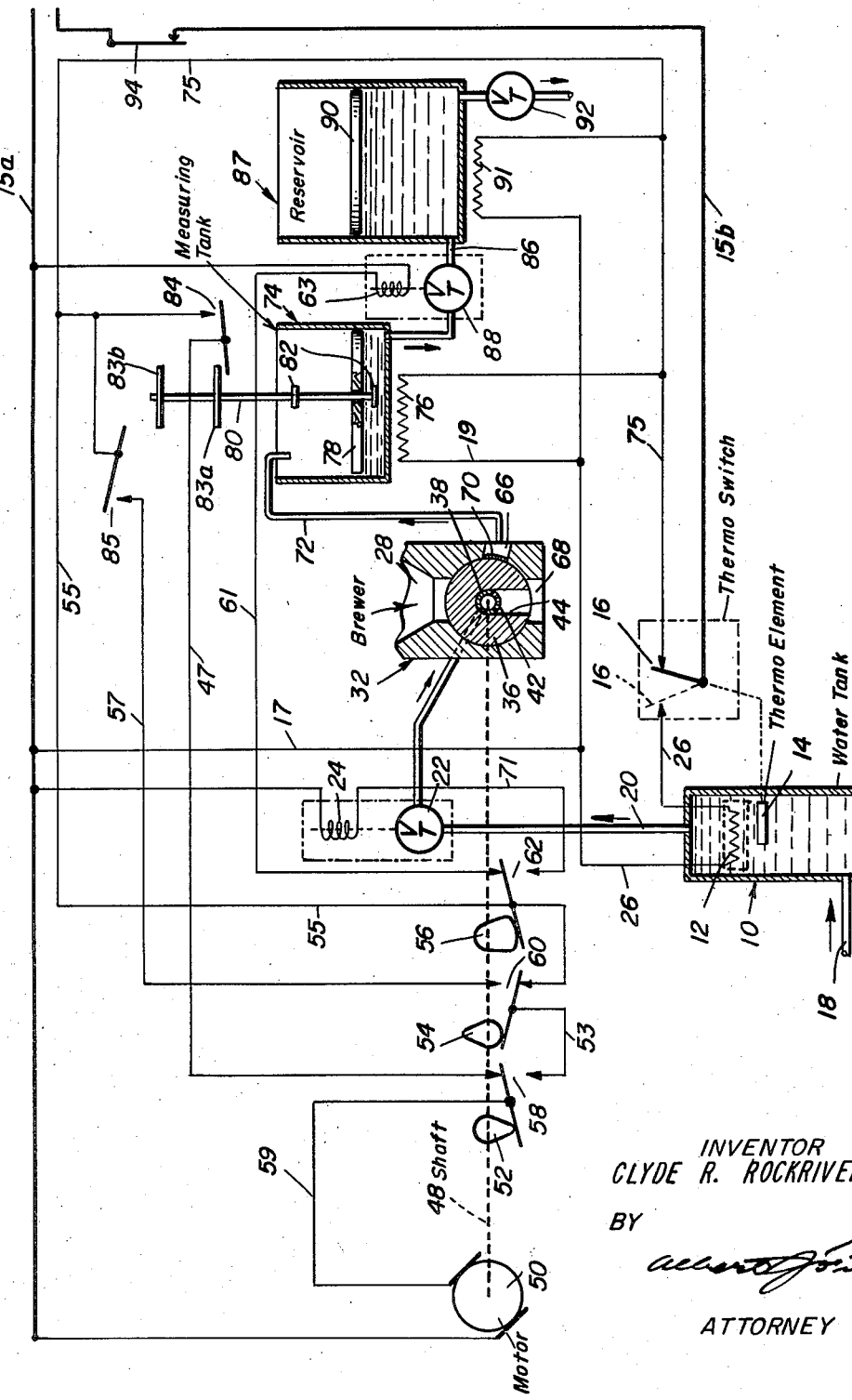
Figure 4 is a wiring diagram, showing the electrical connections and related elements of the coffee brewer and illustrating the same as coordinated with the essential mechanical portions thereof.

The reference numeral 10 indicates generally a water heater, which can be a piece of equipment already in position in a restaurant or similar food dispensing establishment, or preferably, the tank 10 can comprise an integral part of a complete operating apparatus constructed in accordance with the principles of this invention.

The tank includes a heating element 12 which is preferably electrical, but any other source of heat may be employed.

A thermostat 14 is also in the tank 10 and this is connected to a switch 16, which switch will not operate until such time as the water in the tank 10 has attained a desired predetermined temperature. An inlet 18 for fresh cold water is provided and the hot water exits through a pipe 20 which, preferably, is quite short and delivers directly to the actual brewing apparatus through a valve 22. This valve 22 is controlled by a solenoid connected into the electrical circuit of the apparatus by wires 24, and similar wires 26 are employed in connection with the thermo-switch 16.

A storage bin or hopper 28 is provided for freshly ground coffee 30 and this may be of any desired size, depending upon the amount of coffee used, hourly or daily.

As best shown in Figure 2, the coffee 30 from the hopper 28 is allowed to move by gravity into a measuring and brewing device 32, which includes a cylindrical portion 34. A rotatable coffee measuring and brewing element 36 is in the cylindrical portion 34 and this is mounted on a hollow shaft 38 (Figures 2 and 3), which shaft is in alignment with the hot water intake pipe 20 and is connected thereto in leakproof relationship by joint 40 (Figure 1).

The measuring and brewing element 36 is fixed on the hollow shaft 38, as best shown in Figures 2 and 3, and a series of perforations 42 is in the hollow shaft 38, these being adjacent to, and connecting with, a cavity 44 in the measuring and brewing cylinder 36.

This cavity is shaped as best shown in Figure 2 and an "O-ring" or other sealing element 46 is fitted into the cylinder 36 to provide against leakage as the device operates.

The outer end of the hollow shaft 38 is connected by means of a shaft 48 to a motor 50 (Figure 1) and this shaft 48 includes a series of cams 52, 54 and 56 which, as the motor turns, will operate respective and corresponding micro-switches 58, 60 and 62.

A speed-reducing means 64 is provided for the motor 50 whereby the rotation of the shaft 48 and its cams is approximately two revolutions per minute.

The case 32 is provided with one inlet and two outlets 66 and 68, one being for brewed coffee and the other for the disposal of waste grounds, and a screen 70 is fitted into the opening 66 to insure a clear, filtered brew.

A pipe 72 leads from the exit 66 of the brewer 32—36 to a measuring tank 74 which is provided with a heater of some suitable type as at 76.

An air-seal 78 is in the measuring tank 74, adapted to float on the coffee, or other beverage in the tank 74, and, as best shown in Figure 1, this seal conforms very closely to the interior dimensions of the tank 74, so that the beverage in the tank will not become exposed to the air, with possibility of loss of flavor. There is, however, sufficient space around the edges of the seal 78 to allow the brew to reach the lower portion of the tank 74.

A shaft or upright 80 is loosely fitted into the float 78 and extends through an opening in the top of the tank 74. This upright has a series of stops 82 thereon, two of which, when contacted by the float 78, will raise or lower the same.

Additional stops 83a and 83b are at the top of the upright 80 and these, when the upright is moved, will operate switches 84 and 85 respectively.

The operation is as follows:

Assuming the hot water tank 10 to be filled with water and the hopper 28 to be filled with freshly ground coffee, the device is put into operation by throwing a manually-operated single pole double-throw switch 94 (Figure 4). Current is accordingly supplied through wires 15a and 15b. If the water in the tank 10 is cold, the switch 16 will be in the dotted line position, shown in Figure 4. This will allow current to flow through the heating element 12 in the tank but no other part of the circuit will operate. When the water in the tank 10 attains a desired temperature, the thermostat 14 will move the switch 16 to the full line position of Figure 4, and current will then flow to the heaters 76 and 91, also through wire 75 to the closed switch 43, through wire 47, closed switch 58 and wire 59, thereby starting the motor. At the same time, the solenoid 24 opens the valve 22, operating through the then closed switch 62 and the line 55.

As the motor turns the shaft 48 through the speed reducer 62, a charge of ground coffee 30 is dropped from the hopper 28 into the space 44 in the measuring cylinder 36.

Float shaft 80, in its lower most position will close switch 84, allowing current to flow from the line 15 through wire 47 to switch 58 controlled by cam 52 which at that moment is in a position to keep the switch 58 normally closed. At that point, turning of the motor moves all the cams; and cam 52 will then eventually cause an opening of the switch 58, allowing power to flow through the wire 53, bypassing switch 84 and making a circuit through switch 60, which at that time is closed. That allows current to flow back through the wire 55 to the main line 15. The motor continues to turn, moving the cams until cam 54 moves switch 60 into an open position. At the same time the rotation of cam 56 opens the switch 62 which accordingly opens the valve 22 at the hot water tank 10, and at the same time closing the valve 88, which is between the measuring tank 74 and the reservoir 87. This allows hot water to pass through the ground coffee in the compartment 44 of the brewer element 36 and through the pipe 72 to the measuring tank 74.

At this time, the rotation of the motor has moved the cavity 44 in the brewing cylinder 36 into approximately the position shown in the dotted lines 44a in Figure 2, whereupon hot water will flow through the open valve 22 to the ground coffee in the cavity, through the screen 70 and the pipe 72 to the measuring tank 74. This action will continue until such time as the level of the brew in the measuring tank 74 has raised the float 78 to a point where the upper contact 83b operates the switch 85, opening the valve 88. This motion of the projection 83b at the top of the shaft 80 into contact with the switch 85, closes the same and restarts the motor by wire 57 back through the switches 58 and 60 and the wire 59.

The cavity 44 in the cylinder 36 will then have reached the full line position, shown in Figures 2 and 4, whereupon continued flow of water from the tank 10 will wash out the used coffee grounds through the exit 78. Further rotation of the motor will act through the cam 56 to open the switch 62, closing the valve 22 and shutting off the supply of water from the tank 10. However, at this stage no brewed coffee has as yet reached the reservoir 87.

At the same time, freshly brewed coffee from the measuring tank 74 flows past the valve 88 through the pipe 86 to the dispensing reservoir 87 and when the float 90 in this reservoir reaches a predetermined point, corresponding to the level of the float 78 in the measuring tank 74, no more hot water can flow through the valve 22. However, as soon as the coffee is withdrawn through the sanitary valve 92, the level in the reservoir 87 will be automatically maintained until such time as the amount of brewed beverage in the tank 74 reaches a predetermined minimum whereupon the float 78 will contact the lower most stop 82 on the end of the shaft 80, opening the switch 84 which will again start the motor 50 and the process is repeated. The motor accordingly continues to turn, moving the cams 52, 54 and 56 with it. Cam 54 operates switch 60, closing the circuit through wire 55 back to line 15. When the cam 52 operates to break the circuit through switch 58, the motor will stop; and this will be at the lower most position of the cavity 44 whereupon used coffee grounds will be drained off.

The valve 88, having been opened, allows brew to flow from the measuring tank 74 to the reservoir 87. The level of the liquid in the two tanks 74 and 87 will accordingly equalize and will remain in this condition until such time as sufficient beverage has been withdrawn from the reservoir 87 to allow the floats 78 and 90 to drop to a predetermined level whereupon the switch 84 is closed.

Simultaneously, cam 56 in its turning movement will close switch 62 operating to close valve 22 from the hot water tank through its valve 22 controlled by the solenoid 24. Current will then be carried through wires 61 to solenoid 63 which will open the valve 88 allowing the brew to flow from the measuring tank 74 into the reservoir and final dispensing unit 87.

At the end of the operation, the cam 56 has moved the microswitch 62 to break the circuit to the hot water valve, thereby stopping the flow of the hot water through the brewer and making a closed circuit with the measuring tank valve, opening the same. Further movement then ceases.

When the level in the two tanks 74 and 87 drops to a point where the float 78 moves the projection 82 on the rod 80 downwardly, the element 83a will close the switch 84, restarting the entire operation.

It will be evident that herein is provided a coffee brewing apparatus which is entirely and completely automatic in its operation and which will continuously provide a supply of freshly brewed coffee in practically unlimited quantities so long as the supply of coffee and water are maintained in their sources. Additionally, the coffee will retain its freshly brewed flavor even though the withdrawing process is slow or intermittent, because oxidation by reason of air contact is substantially eliminated and the desired temperature of the beverage is always automatically maintained at a predetermined point.

The action is further automatic, in that unless the supply of water, at the proper temperature, is available, the brewing operation will not even be instigated.

Additionally, the device, in its entirety, is relatively simple of construction, is not prohibitive in cost, can be easily maintained in proper working order, as it is composed of a minimum of parts and the tendency of unskilled, unauthorized, or simply inquisitive tampering, is reduced to a low point. For clarity of illustration, the apparatus is indicated as having the interconnected portions considerably spaced apart, but in actual practice, the connections are all quite short and the relationship of the parts is such that there will be no temperature or pressure loss. Further, the connection between the brewer 36 and the measuring tank 74 is such that no back-syphoning is possible.

I am aware that many changes may be made and numerous details of construction varied throughout a wide range without departing from the principles of this invention, and I, therefore, do not propose limiting the patent granted hereon otherwise than as necessitated by the prior art.

I claim as my invention:

1. A coffee brewer comprising a tank for hot water, a hopper for ground coffee adjacent the tank, a brewing device for the water and coffee; said brewing device including a rotatable cylinder beneath the hopper, a compartment in the cylinder for receiving ground coffee, a hollow shaft supporting the cylinder, means for rotating the shaft and cylinder to position the cylinder for reception of ground coffee from the hopper, a pipe connecting said shaft and the hot water tank, perforations in the shaft for allowing hot water to pass through the ground coffee in the brewing compartment of the cylinder, timing means for the brewing operation, said means including a motor for rotating the shaft and the brewing cylinder, control cams on the shaft, a measuring tank and a reservoir tank for the brewed beverage positioned adjacent the brewing device and pipes connecting the same, a source of current for the motor and switches, electrically controlled valves for the brewer and the measuring tank, switches for the valves, the motor and the brewing element, operated by the cams, a filter for the brewed beverage, means for flushing spent grounds from the brewing compartment of the cylinder at one point of its rotation, an antisiphon connection between the measuring tank and the brewer, and a float and associated switch control means positioned in the measuring tank, the float also comprising an anti-oxidation cover for the brewed beverage.

2. A device as described in claim 1, wherein the valve between the measuring tank and the reservoir is automatically closed upon the instigation of the brewing operation, and means to coordinate the levels of the brew in the measuring tank and the reservoir to insure a reserve supply of brew in the reservoir so long as the device is in operation.

References Cited in the file of this patent
UNITED STATES PATENTS

| | | |
|---|---|---|
| 686,515 | Geddes | Nov. 12, 1901 |
| 1,804,795 | Lee | May 12, 1931 |
| 1,805,159 | Bauer et al. | Mar. 12, 1931 |
| 1,822,433 | Brand | Sept. 8, 1931 |
| 2,014,325 | Grilli | Sept. 10, 1935 |
| 2,149,270 | Burgess | Mar. 7, 1939 |
| 2,292,276 | Knoll | Aug. 4, 1942 |
| 2,403,404 | Scott | July 2, 1946 |
| 2,452,933 | Joppich et al. | Nov. 2, 1948 |
| 2,517,073 | Alvarez | Aug. 1, 1950 |
| 2,537,053 | Hemmeter | Jan. 9, 1951 |
| 2,730,034 | Svendsgaard | Jan. 10, 1956 |
| 2,761,200 | Arnett | Sept. 4, 1956 |

FOREIGN PATENTS

| | | |
|---|---|---|
| 279,363 | Germany | Oct. 19, 1914 |
| 373,629 | Great Britain | May 20, 1931 |
| 467,300 | Italy | Dec. 1, 1951 |
| 1,086,762 | France | Aug. 18, 1954 |
| 1,118,772 | France | Mar. 26, 1956 |